United States Patent
Zhu

(10) Patent No.: US 9,424,829 B2
(45) Date of Patent: Aug. 23, 2016

(54) METHOD FOR MANUFACTURING COMPOUND DIAPHRAGM

(71) Applicant: Bingke Zhu, Shenzhen (CN)

(72) Inventor: Bingke Zhu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 1 day.

(21) Appl. No.: 14/522,688

(22) Filed: Oct. 24, 2014

(65) Prior Publication Data

US 2015/0310848 A1 Oct. 29, 2015

(30) Foreign Application Priority Data

Apr. 25, 2014 (CN) .......................... 2014 1 0174168

(51) Int. Cl.
| | |
|---|---|
| *H04R 7/00* | (2006.01) |
| *G10K 13/00* | (2006.01) |
| *B32B 7/12* | (2006.01) |
| *B32B 27/28* | (2006.01) |
| *B32B 27/36* | (2006.01) |
| *B32B 37/12* | (2006.01) |
| *H04R 7/10* | (2006.01) |
| *H04R 31/00* | (2006.01) |
| *B32B 27/08* | (2006.01) |
| *B32B 37/18* | (2006.01) |

(52) U.S. Cl.
CPC . *G10K 13/00* (2013.01); *B32B 7/12* (2013.01); *B32B 27/08* (2013.01); *B32B 27/285* (2013.01); *B32B 27/286* (2013.01); *B32B 27/288* (2013.01); *B32B 27/36* (2013.01); *B32B 37/12* (2013.01); *H04R 7/10* (2013.01); *H04R 31/003* (2013.01); *B32B 37/182* (2013.01); *B32B 2255/10* (2013.01); *B32B 2255/20* (2013.01); *B32B 2255/26* (2013.01); *B32B 2307/10* (2013.01); *B32B 2307/51* (2013.01); *B32B 2307/584* (2013.01); *B32B 2371/00* (2013.01); *B32B 2457/00* (2013.01); *H04R 2307/023* (2013.01); *H04R 2499/11* (2013.01)

(58) Field of Classification Search
CPC ........................................................ H04R 31/003
USPC .................................. 181/167, 168, 169, 170
See application file for complete search history.

(56) References Cited

U.S. PATENT DOCUMENTS

| | | | | |
|---|---|---|---|---|
| 6,097,829 | A * | 8/2000 | Guenther et al. | 381/425 |
| 6,453,049 | B1 * | 9/2002 | Chu et al. | 381/152 |
| 8,544,595 | B2 * | 10/2013 | Suzuki et al. | 181/167 |
| 8,873,776 | B2 * | 10/2014 | Kim et al. | 381/173 |
| 2004/0112672 | A1 * | 6/2004 | Ono et al. | 181/169 |
| 2006/0137935 | A1 * | 6/2006 | Nevill | 181/174 |
| 2010/0288579 | A1 * | 11/2010 | Gerkinsmeyer | 181/169 |
| 2014/0054104 | A1 * | 2/2014 | He et al. | 181/167 |

* cited by examiner

*Primary Examiner* — Forrest M Phillips
(74) *Attorney, Agent, or Firm* — IPro, PLLC; Na Xu

(57) ABSTRACT

The present disclosure provides diaphragm and a method for manufacturing the same. The diaphragm includes a first macromolecular material layer, a graphene layer, a glue layer and a second macromolecular material layer in sequence. The first macromolecular material layer is directly attached to the graphene layer, and the second macromolecular material layer is attached to the graphene layer via the glue layer. The strength and the stiffness of the diaphragm is enhanced to improve the acoustic performances of the diaphragm.

4 Claims, 1 Drawing Sheet

METHOD FOR MANUFACTURING COMPOUND DIAPHRAGM

FIELD OF THE INVENTION

The present disclosure relates to a diaphragm and a method for manufacturing the same.

DESCRIPTION OF RELATED ART

As being propelled by the increasingly heightened requirements on mobile phones in the market, the mobile phones, the mobile phones trends to be designed with low profile and better sound quality. For meeting this trend or requirement, acoustic component used in the mobile phones should also be designed to have small size, and high sound quality.

Diaphragms are core component of an acoustic component, so the demand for acoustic performances of the diaphragms becomes also higher correspondingly.

The diaphragms in the related art are formed of a single cloth diaphragm or other materials, which can be hot-press molded, through a pressing process. However, the diaphragms of this structure tend to produce the split vibration due to the insufficient stiffness of the diaphragms, and this leads to distortion and adversely affects the hearing experience. Additionally, in practical applications, in order to enhance the strength of the diaphragms without affecting the sound quality, a common practice in the art is to increase the thickness of partial areas of the diaphragms. However, the diaphragms formed of a single material have the same thickness throughout the diaphragms once being produced, so they cannot satisfy the aforesaid need.

Accordingly, the present disclosure provides a novel diaphragm to overcome the aforesaid shortcomings.

DETAILED DESCRIPTION OF EMBODIMENT OF THE INVENTION

Figure 1:
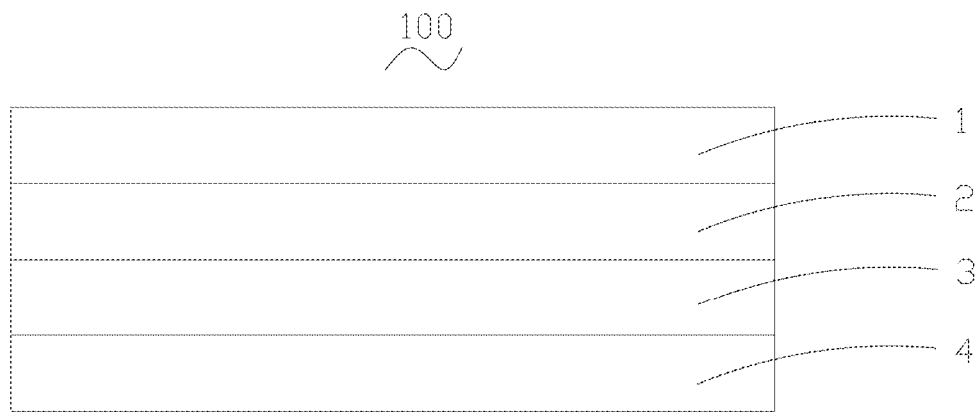
FIG. 1 is a schematic cross-sectional view of a diaphragm of the present disclosure.

Hereinbelow, a diaphragm and a method for manufacturing a diaphragm thereof according to the present disclosure will be described in detail with reference to the attached drawings. Referring to FIG. 1, a schematic cross-sectional view of the diaphragm is shown therein.

A diaphragm 100 comprises a first macromolecular material layer 1, a graphene layer 2, a glue layer 3 and a second macromolecular material layer 4 arranged in sequence. The graphene layer 2 and the second macromolecular material layer 4 are attached with each other via the glue layer 3. In this embodiment, the first macromolecular material layer 1 is closely attached to the graphene layer 2 through a physical process or a chemical process without glue therebetween. Be noted that a glue layer is also applicable for attaching the first macromolecular material layer 1 to the graphene layer 2. The structure of the diaphragm can effectively improve the strength and stiffness of the diaphragm and can restrain the split vibration (unbalanced vibration), thereby providing a better acoustic performance.

The physical process or the chemical process may be any of an evaporation process, a physical vapor deposition (PVD) process, a chemical vapor deposition (CVD) process, a sputtering process, a spray coating process, or a printing process. Most preferably, the evaporation process is used. Through use of this process, the graphene layer and the first macromolecular material layer can be attached together more closely to reduce the possibility of occurrence of the split vibration and to eliminate the need of a gluing step, thus making the production process convenient.

The first macromolecular material layer 1 and the second macromolecular material layer 4 may be formed of a same material, which may be any of polyetheretherketone (PEEK), polyethylene naphthalate (PEN), polyethylene terephthalate (PET), polyphenylene sulfide (PPS) and polyarylate (PAR). Alternatively, the first macromolecular material layer 1 and the second macromolecular material layer 4 may be formed of different materials selected from the aforesaid materials respectively.

Most preferably, both the first macromolecular material layer 1 and the second macromolecular material layer 4 are formed of PEEK because of the high elasticity modulus and the high abrasive resistance of PEEK. This can enhance the strength and the stiffness of the diaphragm to further improve the acoustic performances of the diaphragm.

Figure 2:
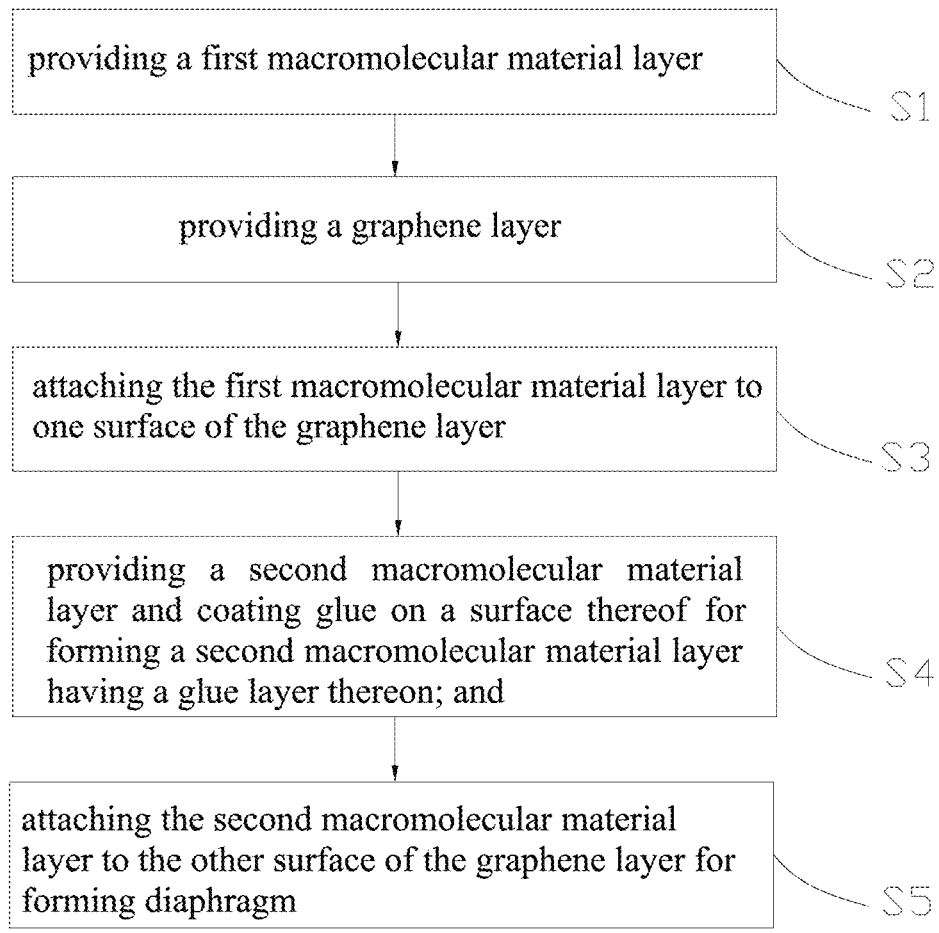
FIG. 2 is a flowchart view of a process for manufacturing the diaphragm in FIG. 1.

Referring to FIG. 2, a flowchart view of a method for manufacturing a diaphragm mentioned above of the present disclosure is shown therein.

The method for manufacturing a diaphragm comprises the following steps:

Step 1: providing a first macromolecular material layer;

Step 2: providing a graphene layer;

Step 3: attaching the first macromolecular material layer to one surface of the graphene layer;

Step 4: providing a second macromolecular material layer and coating a glue on a surface thereof to form a second macromolecular material layer having a glue layer thereon; and Step 5: attaching the glue layer of the second macromolecular material layer to the other surface of the graphene layer to form a diaphragm.

In the step 3, physical process or chemical process may be used for attaching the first macromolecular material layer to one surface of the graphene layer, such as evaporation process, physical vapor deposition (PVD) process, chemical vapor deposition (CVD) process, sputtering process, spray coating process, or printing process. Most preferably, the evaporation process is used. Through use of this process, the graphene layer and the first macromolecular material layer can be attached together more closely to reduce the possibility of occurrence of the split vibration and to eliminate the need of a gluing step, thereby making the production process convenient.

In the step 5, the glue layer is attached to the other surface of the graphene layer. That is, the resulting diaphragm has a macromolecular material layer on both sides thereof, with the graphene layer being located between the first macromolecular material layer and the second macromolecular material layer. Such a structure has the optimum performances.

The two macromolecular material layers may be of a same material, and usually may be formed of any of polyetheretherketone (PEEK), polyethylene naphthalate (PEN), polyethylene terephthalate (PET), polyphenylene sulfide (PPS) or polyarylate (PAR); and alternatively, they may be formed of different materials selected from the aforesaid materials respectively.

Most preferably, both the first macromolecular material layer and the second macromolecular material layer are formed of PEEK because of the high elasticity modulus and the high abrasive resistance of PEEK. This can enhance the strength and the stiffness of the diaphragm to further improve the acoustic performances of the diaphragm.

The method for manufacturing a diaphragm of the present disclosure is simple, has a low production cost, and can provide a diaphragm with high strength and superior performances, and as compared to the conventional diaphragms, the diaphragm prepared by this method is more robust, stable and reliable. The diaphragm prepared by this method can be used in electroacoustic devices such as loud speakers and sound receivers.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A diaphragm, comprising:
   a first macromolecular material layer;
   a graphene layer;
   a glue layer;
   a second macromolecular material layer; wherein the first macromolecular material layer is closely directly attached to the graphene layer though one of evaporation process, physical vapor deposition (PVD) process, chemical vapor deposition (CVD) process, sputtering process, spray coating process, and printing process, and the second macromolecular material layer is attached to the graphene layer via the glue layer.

2. The diaphragm of claim 1, wherein the first macromolecular material layer and the second macromolecular material layer are formed of any one or two of polyetheretherketone (PEEK), polyethylene naphthalate (PEN), polyethylene terephthalate (PET), polyphenylene sulfide (PPS) and polyarylate (PAR) respectively.

3. A method for manufacturing a diaphragm in one of claims 1-2, comprising the following steps:
   Step 1: providing a first macromolecular material layer;
   Step 2: providing a graphene layer;
   Step 3: attaching the first macromolecular material layer to one surface of the graphene layer though one of evaporation process, physical vapor deposition (PVD) process, chemical vapor deposition (CVD) process, sputtering process, spray coating process, and printing process;
   Step 4: providing a second macromolecular material layer and coating glue on a surface thereof for forming a second macromolecular material layer having a glue layer thereon; and
   Step 5: attaching the second macromolecular material layer to the other surface of the graphene layer for forming diaphragm.

4. The method for manufacturing a diaphragm of claim 3, wherein the first macromolecular material layer and the second macromolecular material layer are formed of any one of polyetheretherketone (PEEK), polyethylene naphthalate (PEN), polyethylene terephthalate (PET), polyphenylene sulfide (PPS) and polyarylate (PAR) respectively.

* * * * *